United States Patent [19]

Scott

[11] Patent Number: 5,505,567
[45] Date of Patent: Apr. 9, 1996

[54] CLOSED LOOP CONDITIONING SYSTEM FOR EXTRUDED PRODUCTS

[75] Inventor: Nicholas B. Scott, Sabetha, Kans.

[73] Assignee: Wenger Manufacturing, Inc., Sabetha, Kans.

[21] Appl. No.: 247,245

[22] Filed: May 23, 1994

[51] Int. Cl.⁶ .................................................. B65G 53/28
[52] U.S. Cl. ............................................ 406/106; 406/56
[58] Field of Search ................................ 406/56, 61, 106

[56] References Cited

U.S. PATENT DOCUMENTS

| | | | |
|---|---|---|---|
| 1,912,910 | 6/1933 | Neuman et al. | 406/106 X |
| 2,698,799 | 1/1955 | Rupp et al. | 426/449 |
| 3,054,677 | 9/1962 | Graham, Jr. et al. | 426/446 |
| 3,462,277 | 8/1969 | Reinhart | 426/465 |
| 3,661,071 | 5/1972 | Toei et al. | 99/323.4 |
| 3,754,930 | 8/1973 | Toei et al. | 426/447 |
| 3,809,438 | 5/1974 | Hubbard | 406/106 |
| 4,058,634 | 11/1977 | Kunz | 426/456 |
| 4,334,366 | 6/1982 | Lockwood | 34/425 |
| 4,422,809 | 12/1983 | Bonin et al. | 406/106 X |
| 4,812,086 | 3/1989 | Kopernicky | 406/106 X |
| 5,002,787 | 3/1991 | Fraile et al. | 426/233 |
| 5,054,965 | 10/1991 | Clark et al. | 406/151 |

*Primary Examiner*—Andrew C. Pike
*Attorney, Agent, or Firm*—Hovey, Williams, Timmons & Collins

[57] ABSTRACT

An improved extrusion conditioning apparatus (10) includes an extrusion and cooker (12) and a closed loop pneumatic conditioning system (14) operatively coupled with the cooker (12). The closed loop system (14) includes a hood (16) disposed about the extruder outlet, together with first and second conduits (20, 22) operatively coupled with the hood and a cyclone separator (18); and a fan (24) and a heater (26) are operatively interposed within the conduit (22). In use, extrudate from extruder (12) is picked up by positive pressure air currents created by the fan (24), and such product is then conveyed to the separator (18) for separation thereof. The separated air then returns to the hood (16) via the conduit (22), and is heated during such return passage. Use of a largely positive pressure, heated air conveying system (14) minimizes product contamination by airborne microorganisms, while at least partially sterilizing the product prior to drying thereof.

7 Claims, 2 Drawing Sheets

CLOSED LOOP CONDITIONING SYSTEM FOR EXTRUDED PRODUCTS

BACKGROUND OF THE INVENTION

1. Field of the Invention

The present invention is broadly concerned with an improved, closed loop pneumatic device for the conditioning of extruded products and prevention of microorganism contamination thereof. More particularly, the invention is concerned with such a closed loop system, wherein products emerging from an extrusion cooker are conveyed by positive pressure air to a cyclone separator with air exiting the separator preferably being heated prior to return thereof for pickup of additional extrudate. In this way, contamination of the products by air borne microorganisms is prevented, and the products are heat treated and conditioned prior to drying.

2. Description of the Prior Art

Extrusion cookers have long been used for the fabrication of a variety of human and animal foods. Generally speaking, such cookers include an elongated barrel having an axially rotatable auger screw therein, and an endmost extrusion die. Most commonly, these extruders are configured for high-temperature short-time (HTS) processing of starting materials and subject such materials to increasing levels of heat, pressure, and shear during passage through the extruder barrel and die. After extrusion, it is common to convey the products to a dryer where the moisture level thereof is reduced.

An example of this type of equipment is illustrated in U.S. Pat. No. 5,054,965, which is incorporated by reference herein. The '965 patent describes use of a negative pressure conveying system wherein air is drawn into the system by means of a fan forming a part of the apparatus. However, this inevitably means that airborne, potentially contaminating microorganisms are drawn into the conveying system and contact the extrudate when it is warm and moist and therefore most susceptible to contamination.

There is accordingly a need in the art for an improved conveying apparatus which minimizes microorganisms contamination of extruded products, while at the same time serving to condition and kill microorganisms in the product before final drying thereof.

SUMMARY OF THE INVENTION

The present invention overcomes the problems outlined above, and provides extrusion conditioning apparatus in in the form of an extrusion cooking device, and a specialized, closed loop pneumatic conditioning system coupled with the extruder.

The extruder is itself conventional and includes an elongated barrel having an axially rotatable, powered screw therein, and an endmost extrusion die; the device is operable for creating a stream of extruded products from the die, in a manner well known to those skilled in the art.

The conditioning system includes a hood disposed about the extruder die and oriented to directly receive a stream of extruded products, with the hood including an air inlet and an air outlet. A conveying and separating assembly is coupled with the hood and has first and second conduits each having an inlet end and an outlet end. The inlet end of the first conduit is coupled with the hood air outlet, whereas the outlet end of the second conduit is coupled with the hood air inlet. The outlet end of the first conduit and the inlet end of the second conduit are each connected with a cyclone separator having an inlet for entrance of air and conveyed extruded products, and air outlet, and an extruded product outlet. The separator is operable for separating the extruded product from a stream of pressurized air delivered thereto, with the separated air being directed to the inlet of the second conduit.

In preferred forms, the second conduit includes fan means interposed therein for creating positive pressure air in the hood and first conduit in order to convey the stream of extruded product in a positive pressure air stream to the separator. Furthermore, heating means is preferably interposed in the second conduit, normally upstream of the fan means. The heating means serves to heat the separated air from the cyclone separator before return thereof to the hood for pickup of additional extrudate.

The invention also includes a method of forming and conditioning an extruded product involving the steps of first creating a stream of extruded product at a product pickup zone, and inducing a positive pressure air stream which conveys the extrudate from the pickup zone into and through a cyclone separator for separation of the extruded product and passage of air from the separator. This separated air is then directed from the cyclone separator back to the product pickup zone; during such return travel, the air is preferably heated for conditioning of extrudate.

In preferred practice, the return air from the cyclone separator is heated to a temperature of from about 100°–500° F., and more preferably from about 120°–200° F. In this way, the most consistent conditioning of extrudate is achieved. Further, the maximum positive pressure of air within the conditioning apparatus should generally be in the range of from about 10 in. to 90 in. WCG (water column gauge), and more preferably from 20 in. to 30 in. WCG. Of course, pressure conditions within the overall system will vary from a maximum positive pressure to a negative pressure at the inlet side of the fan means.

DETAILED DESCRIPTION OF THE PREFERRED EMBODIMENTS

Figure 1:
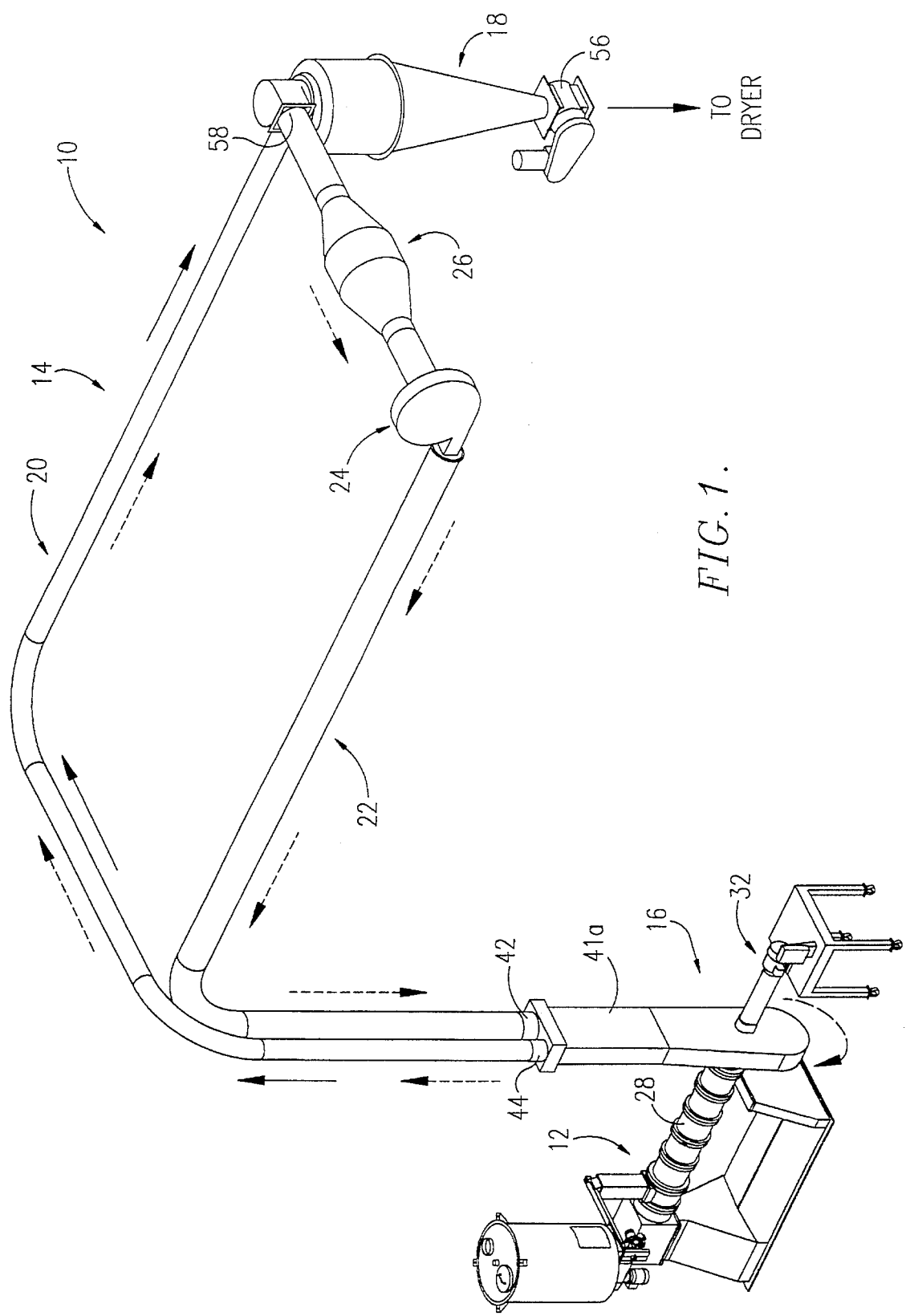
FIG. 1 is a perspective view illustrating the extrusion conditioning apparatus of the invention.

Turning now to the drawings, and particularly FIG. 1, an extrusion conditioning apparatus 10 is illustrated, which broadly includes an extrusion cooker device 12 together with a closed loop pneumatic conditioning system 14 operatively coupled with the device 12. Broadly, the system 14 includes a hood 16 adjacent the outlet of the extruder device, a cyclone separator 18, and first and second conduits 20, 22 operatively interconnecting the hood 16 and separator 18. In the form shown, the conduit 22 includes fan means 24 and heater 26 interposed therein. Also, the hood 16 and conditioning system 14 are normally provided with static heat insulation.

Figure 2:
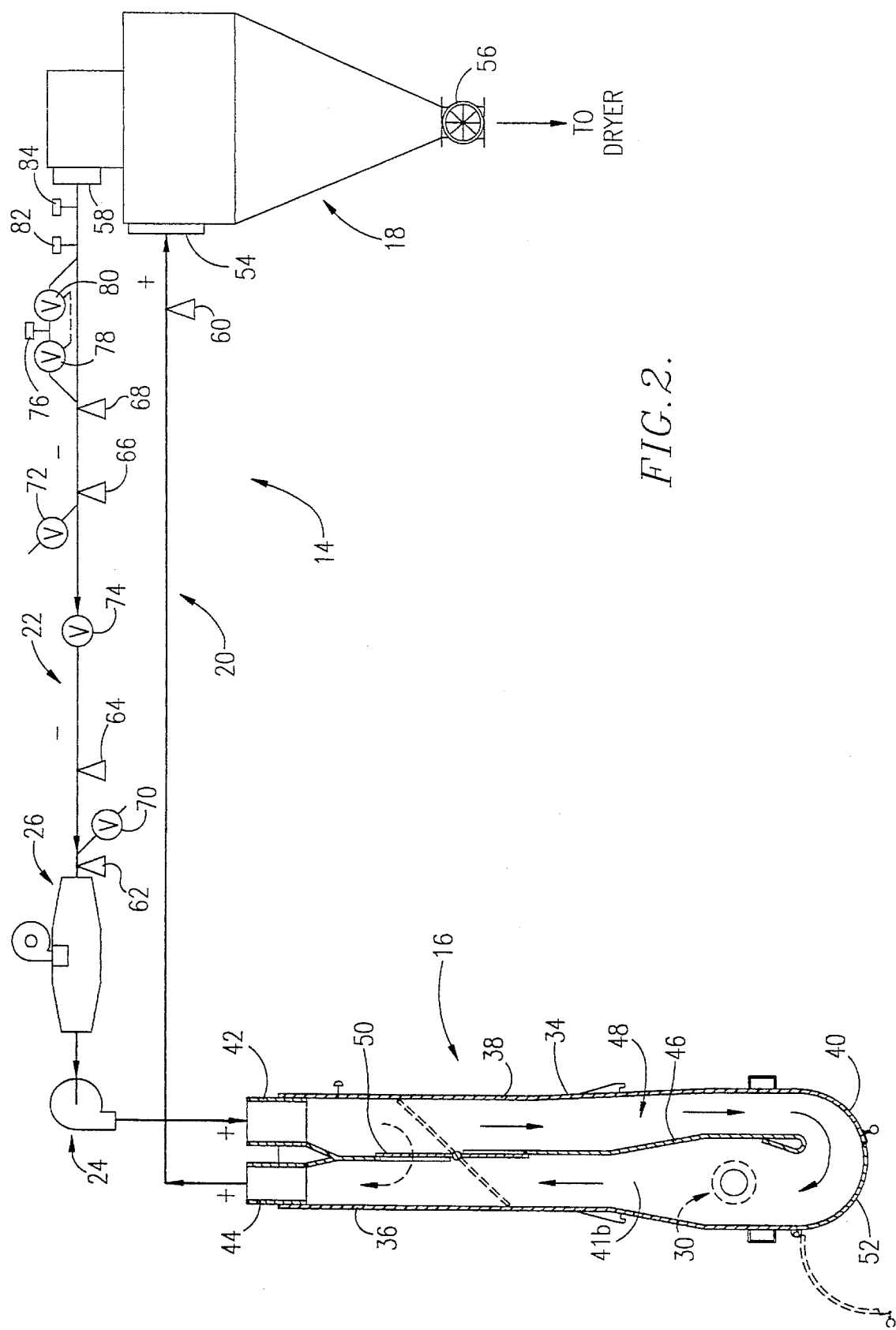
FIG. 2 is a schematic view of the conditioning apparatus schematically depicting air flow paths and controls used in the preferred embodiment.

In more detail, the extruder device 12 is of conventional design and includes an elongated, sectionalized barrel 28 equipped with an internal, helical auger screw and presenting an endmost extrusion die 30 (see FIG. 2). The depicted device 12 is an extruder commercialized by Wenger Manufacturing, Inc. of Sabetha, Kansas and is adapted for receiving incoming product to be processed and for generating from die 30 a stream of extruded products. A conventional knife (not shown), powered by an external drive 32 passing through hood 16, is employed to cut the emerging extrudate stream from die 30 into convenient lengths. Extruders of this type are depicted in U.S. Pat. No. 3,970,761, which is incorporated by reference herein.

The hood 16 is in the form of an elongated, upright hollow metallic body 34 which is positioned at the output end of extruder 12 and receives die 30. The body 34 is made up of a pair of opposed sidewalls 36, 38 as well as a lowermost, arcuate bottom wall 40 and front and rear walls 41a, 41b. The upper end of hood 16 is provided with an inlet 42 as well as an adjacent outlet 44. Internally, the hood 16 includes an elongated divider wall 46 spanning the front and rear walls 41a, 41b and positioned between sidewalls 36 and 38 to define an air flow path 48. The path 48 extends from inlet 42 downwardly along the length of divider wall 46 and thence upwardly past die 30 to outlet 44. It will also be observed that the divider wall 46 includes a pivotally mounted diverter segment 50 which can be selectively moved to a normal position illustrated in full lines to a diversion position depicted in phantom. Additionally, the arcuate bottom wall 40 includes a hingedly mounted drop out panel 52 which is used in conjunction with diverter 50.

The separator 18 is of conventional frustoconical design and includes an inlet 54 for receiving an incoming stream of air and conveyed products, a lowermost product outlet 56, and an air outlet 58.

First conduit 20 is simply a tubular line operatively coupled at one end thereof to hood outlet 44 and at the other end thereof to separator inlet 54. However, second conduit 22, which is coupled at the inlet end thereof with separator outlet 58 and at the opposite end thereof to hood inlet 42, includes two other operating components. Specifically, it will be seen that air fan 24 and heater 26 are disposed within conduit 22, with the fan 24 being downstream of heater 26, i.e., the fan 24 is disposed between heater 26 and hood inlet 42. The fan 24 serves to create a stream of positive pressure air in the system 20, and specifically in hood 16, first conduit 20, and in separator 18. The qualitative pressure conditions within the conduits 20, 22 are illustrated in schematic FIG. 2 wherein "+" refers to positive pressure, and "−" refers to negative pressure.

The heater 26 may be of any conventional design and is configured for heating air passing therethrough prior to entrance of such air into hood 16. Either gas fired or electric heaters may be used, although gas fired are normally preferred. Alternately, steam can be injected into the conduit system 14 at an appropriate location.

A series of operating controls are also provided in the conduits 20, 22. In particular, pitot and static pressure sensors 60, 62 are provided adjacent separator inlet 54 and on the inlet side of heater 26; additional pitot and static pressure sensors 64, 66, and 68 are also provided in conduit 22 at the positions shown. A bleed-in butterfly valve 70 is positioned adjacent sensor 62 and is used for maintaining standard conditions. Also, all air introduced to the system 14 and circulating therethrough may be sterilized or filtered to eliminate contaminants. A bleed-off butterfly valve 72 is also provided just downstream of sensor 66. A static control butterfly valve 74 is interposed between sensor 64 and valve 72 as shown. A relative humidity and pressure sensor readout device 76, operatively coupled with a pair of limited, interconnected butterfly valves 78, 80 is interposed in line 22. Finally, a temperature controller 82 for closing and opening the limited butterfly valves 78, 80 is positioned within line 22, as well as a high temperature system cutoff device 84.

In the normal use of apparatus 10, extrudate created by extruder 12 and its associated knife assembly is picked up and conveyed by positive pressure air currents within hood 16. This air and conveyed product travels via conduit 20 to separator 18, whereupon the product is separated and is directed to a downstream dryer. The separated air passes through outlet 58 for passage through conduit 22 where it is heated via heater 22 or similar means. Of course, fan 24 serves to induce the pneumatic air currents within the system 14. Inasmuch as the air passing through system 14 is heated, the product from the extruder is conditioned prior to drying and is at least partially sterilized. Furthermore, the positive pressure nature of the system insures that only limited amounts of air are drawn into the system, thus reducing the possibility of contamination by airborne microorganisms.

In the event that undesired products are created by extruder 12 (as during startup), the hood 16 can be used to divert the product to dump. This involves pivoting of diverter segment 50 to the phantom line position depicted in FIG. 2, followed by opening of dropout panel 52. As will be readily appreciated by a study of FIG. 2, airflow through hood 16 and system 14 is terminated under these conditions, and the product from the extruder 12 simply drops from hood 16 through the dropout created by opening of panel 52. These operations can be automated if desired, through the use of conventional controls and piston and cylinder assemblies associated with diverter 50 and panel 52.

I claim:

1. Extrusion conditioning apparatus comprising:

an extrusion cooker device including an elongated barrel and an endmost extrusion die, said device being operable for creating a stream of extruded products from said die; and a closed loop pneumatic conditioning system operatively coupled with said extrusion cooker device for receiving and conditioning said stream of extruded products, said system including a hood disposed about said extrusion die and oriented to receive said stream of extruded products, said hood including an air inlet and an air outlet, an extruded product conveying and separating assembly operatively coupled with said hood and including first and second conduits each having an inlet end and an outlet end, the inlet end of said first conduit being operatively coupled with said hood air outlet, the outlet end of said second conduit being operatively coupled with said hood air inlet, a cyclone separator presenting an inlet for entrance of air and conveyed extruded products, an air outlet, and an extruded product outlet, the outlet end of said first conduit being operatively coupled with said separator inlet, the inlet end of said second conduit being operatively coupled with said separator air outlet, fan means operatively coupled with said assembly for creating a stream of positive pressure air in said hood and said first conduit in order to convey said stream of the extruded product in said positive pressure air stream to said cyclone separator for separation of the extruded product, said separator being operable for separating said conveyed extruded product from said stream of pressurized air delivered to said separator inlet, and heating means interposed in said second conduit for heating of air passing therethrough.

2. The apparatus of claim 1, wherein said fan means is interposed in said second conduit.

3. The apparatus of claim 1, wherein said hood includes an internal wall for separating said hood air inlet and said hood air outlet in order to cause said air passing from said hood air inlet to said hood air outlet to travel along a path for conveying said stream of extruded products.

4. The apparatus of claim 3, wherein said wall includes a selectively openable diverter panel permitting passage of said air directly from said hood air inlet to said hood air outlet without passage of said air adjacent said extrusion die.

5. A method of forming and conditioning an extruded product, comprising the steps of:

creating a stream of extruded product at a product pickup zone;

inducing a positive pressure air stream, and causing said positive pressure air stream to convey said extruded product from said pickup zone to a cyclone separator for cyclonic separation of the extruded product from said positive pressure air stream, and four passage of air from the separator;

directing the air from said cyclone separator back to said product pickup zone; and heating said air during said directing thereof from said cyclone separator back to said product pickup zone.

6. The method of claim 5, said heating step comprising the step of heating said air to a temperature of from about 100° to 500° F.

7. The method of claim 5, including the step of operating fan means to create a negative pressure air stream from said cyclone separator, and for creating said positive pressure air stream.

* * * * *